(12) United States Patent
Meunier et al.

(10) Patent No.: US 8,812,870 B2
(45) Date of Patent: Aug. 19, 2014

(54) CONFIDENTIALITY PRESERVING DOCUMENT ANALYSIS SYSTEM AND METHOD

(71) Applicant: Xerox Corporation, Norwalk, CT (US)

(72) Inventors: Jean-Luc Meunier, St. Nazaire les Eymes (FR); Herve Dejean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 71 days.

(21) Appl. No.: 13/648,462

(22) Filed: Oct. 10, 2012

(65) Prior Publication Data

US 2014/0101456 A1    Apr. 10, 2014

(51) Int. Cl.
*G06F 12/14*    (2006.01)

(52) U.S. Cl.
USPC .......................................................... 713/189

(58) Field of Classification Search
CPC ................................ G06F 21/10; H04L 9/08
USPC ........................................... 13/189; 713/189
See application file for complete search history.

(56) References Cited

U.S. PATENT DOCUMENTS

| | | | |
|---|---|---|---|
| 5,708,730 A | | 1/1998 | Itonori |
| 6,385,341 B1 * | | 5/2002 | Lisitsa et al. .................. 382/233 |
| 6,424,989 B1 * | | 7/2002 | Shaw et al. .................... 709/201 |
| 6,785,420 B2 | | 8/2004 | Yamaai |
| 7,392,473 B2 | | 6/2008 | Meunier |
| 7,693,848 B2 | | 4/2010 | Dejean |
| 7,739,587 B2 | | 6/2010 | Vion-Dury |
| 7,743,327 B2 | | 6/2010 | Meunier et al. |
| 7,890,859 B2 | | 2/2011 | Meunier |
| 7,937,653 B2 | | 5/2011 | Dejean et al. |
| 2004/0013302 A1 | | 1/2004 | Ma et al. |
| 2006/0155703 A1 * | | 7/2006 | Dejean et al. ...................... 707/7 |
| 2009/0132564 A1 * | | 5/2009 | Ishizaki ......................... 707/100 |
| 2010/0077216 A1 * | | 3/2010 | Kramer et al. ................ 713/172 |
| 2010/0306260 A1 * | | 12/2010 | Dejean .......................... 707/776 |
| 2012/0005225 A1 | | 1/2012 | Chidlovskii |
| 2012/0057178 A1 * | | 3/2012 | Toscano ....................... 358/1.13 |

OTHER PUBLICATIONS

Dejean, et al. "A System for Converting PDF Documents into Structured XML format", Lecture Notes in Computer Science 2006, vol. 3872, pp. 129-140.

Chanod, et al. "From Legacy Document to XML: A conversion Framework", $9^{th}$ European Conf. on Research and Advanced Technology for Digital Libraries, Sep. 18-23, 2005.

(Continued)

*Primary Examiner* — Kambiz Zand
*Assistant Examiner* — Aubrey Wyszynski
(74) *Attorney, Agent, or Firm* — Fay Sharpe LLP (57) ABSTRACT

A method and system for document processing allow a service provider to process a document without having access the textual content of the document. The system includes memory which receives an encoded source document from an associated client system. The encoded source document includes structural information and encoded content information. The encoded content information includes a plurality of encoded tokens generated by individually encoding each of a plurality of text tokens of the source document. The structural information includes location information for each of the plurality of text tokens. A processing module processes the encoded document to generate a modified document, without decoding the encoded tokens. A transmission module transmits the modified document to an associated client system whereby the client system is able to generate a transformed document based on the modified document and the plurality of text tokens.

27 Claims, 5 Drawing Sheets

(56) References Cited

OTHER PUBLICATIONS

Meunier. "Optimized XY-cut for Determining a Page Reading Order" 8$^{th}$ ICDAR, vol. 1, 2005, pp. 347-357.

Dejean, et al. "Structuring documents according to their table of contents", Proceedings of the 2005 ACM Symposium on Document engineering, 2005, pp. 2-9.

Meunier, et al. "About tables of contents and how to recognize them", IJDAR, vol. 12, No. 1, 2009, pp. 1-20.

U.S. Appl. No. 13/103,216, filed May 9, 2011, Vion-Dury.
U.S. Appl. No. 13/484,708, filed May 31, 2012, Dejean.
U.S. Appl. No. 13/462,053, filed May 2, 2012, Meunier.
U.S. Appl. No. 12/974,843, filed Dec. 21, 2010, Dejean.
U.S. Appl. No. 13/155,011, filed Jun. 7, 2011, Dejean.
U.S. Appl. No. 13/162,858, filed Jun. 17, 2011, Dejean.

\* cited by examiner

FIG. 1

```
namespace rng = "http://relaxng.org/ns/structure/1.0"
start =
        element DOCUMENT {           ←—20
            element PAGE {          ←—22
                a-Size,
                element COLUMN{     ←—24
                    element PARAGRAPH   ←—26
                        element TEXT {  ←—28
                            a-Size,
                            element TOKEN {  ←—30
                        32—→    a-BoundingBOX,
                                a-typography,
                                Text
                            }+
                        }+
                    }+
                }+
            }+
        }
    a-Size =
        attribute width { xsd:decimal },
        attribute height { xsd:decimal }
    a-BoundingBox=
34 {    attribute x { xsd:decimal },
        attribute y { xsd:decimal },
        a-Size
    a-typography =
        attribute base { xsd:decimal },
        attribute font-size { xsd:string },
        attribute font-name { xsd:string },         16
        attribute font-color { xsd:string },
        attribute italic { "yes" | "no" },
        attribute bold { "yes" | "no" }
```

CONFIDENTIALITY PRESERVING DOCUMENT ANALYSIS SYSTEM AND METHOD

BACKGROUND

The exemplary embodiment relates to the field of electronic document processing. It finds particular application in connection with electronic document format conversion and in particular with processing documents formatted in an unstructured or semi-structured format, and will be described with particular reference thereto. However, it is to be appreciated that the following is amenable to other like applications.

Organizations frequently have documents that are stored in an unstructured or semi-structured format that is difficult to reformat for different viewing devices. A common task is the batch conversion of these documents into an electronic form which allows searching and automatic transformation for presentation by different devices. Legacy documents are frequently either stored as Adobe portable document format (PDF) files or scanned from hard copies into PDF. Other common formats are image format such as portable network graphics format (png), graphics interchange format (gif), and the like. Legacy documents may also be in word processing formats or other, possibly proprietary, formats. The target formats are often XML, SGML, or HTML, which allows easy conversion into other structured formats, e.g., the epub format for ebook readers. Reformatting into the structured document may entail segmenting the document by finding paragraph divisions and generating a table of contents, information that is not readily available from unstructured scanned documents or PDF documents.

When large quantities of such documents are to be processed, batch processing by an outside service provider may be desirable. If the documents are confidential in nature, however, there may be concerns that sensitive information may be released, either during transmission or by the service provider. An encrypted channel may be used to protect the sensitive information during transmission, but this still poses a risk of disclosure by the service provider when the documents are decrypted.

It would be desirable to have a method and system for transmitting a document such that a service provider may perform processing of the structure of the document and limited processing of the content without having full access to the content.

INCORPORATION BY REFERENCE

The following reference, the disclosure of which is incorporated herein by reference in its entirety, is mentioned:

U.S. application Ser. No. 13/103,216, filed on May 9, 2011, entitled METHOD AND SYSTEM FOR SECURED MANAGEMENT OF ONLINE XML DOCUMENT SERVICES THROUGH STRUCTURE-PRESERVING ASYMMETRIC ENCRYPTION, to Vion-Dury, describes a method of allowing the service provider to process structural data without having access to the textual information of a document.

BRIEF DESCRIPTION

In accordance with one aspect of the exemplary embodiment, a system for processing an encoded source document includes memory which receives an encoded source document from an associated client system, the encoded source document comprising structural information and encoded content information, the encoded content information comprising a plurality of encoded tokens generated by individually encoding each of a plurality of text tokens of the source document, the structural information comprising location information for each of the plurality of text tokens. A processing module processes the encoded document, without decoding the encoded tokens, to generate a modified document. A transmission module transmits the modified document to an associated client system whereby the client system is able to generate a transformed document based on the modified document and the plurality of text tokens. A processor implements one or more of the modules.

In accordance with another aspect of the exemplary embodiment, a method of processing an encoded source document includes receiving an encoded source document from an associated client system, the encoded source document including structural information and encoded content information. The encoded content information includes a plurality of encoded tokens, the encoded tokens having been generated by individually encoding each of a plurality of text tokens of the source document to a respective value. The structural information includes location information for each of the plurality of tokens. The encoded document is processed using a processor, without decoding the encoded tokens, to generate a modified document. The modified document is transmitted to an associated client system, whereby the client system is able to generate a transformed document based on the modified document and plurality of text tokens.

In accordance with another aspect of the exemplary embodiment, a computer system includes memory which receives a source document. The source document includes content information and structural information. The content information includes a plurality of text tokens. The structural information includes location information for each of the plurality of text tokens. An encoding module encodes each of the plurality of text tokens individually to produce an encoded document including encoded tokens. A transmission module transmits the encoded document to an associated service provider for processing the encoded document to generate a modified document. The encoded document being transmitted in a manner which allows the service provider to access at least a part of the structural information without decoding the encoded tokens. A reconstruction module generates a transformed document based on the modified document received from the service provider and the text tokens. A processor implements one or more of the modules.

The content information includes a plurality of tokens. The structural information includes location information for each of the plurality of tokens. An encoding module encodes each of the tokens of the content information individually to produce an encoded document. A transmission module transmits the encoded document to an associated service provider for processing the encoded document to generate a modified document, the encoded document being transmitted in a manner which allows the service provider to access at least a part of the structural information without decoding the content information. A reconstruction module generates a transformed document based on the modified document received from the service provider. A processor implements one or more of the modules.

In accordance with another aspect of the exemplary embodiment, a method for processing a source document includes receiving a source document, the source document including structural information and content information, the content information comprising a plurality of tokens. The method further includes encoding each of the plurality of tokens individually to produce an encoded document, and transmitting the encoded document to an associated service provider for processing the encoded document to generate a modified document, the encoded document being transmitted in a manner which allows the service provider to access at least a part of the structural information without decoding the content information. A transformed document is generated based on the modified document received from the service provider and the transformed document is output.

DETAILED DESCRIPTION

Aspects of the exemplary embodiment relate to a method and system for document encoding which allows a service provider to process a document without having access the textual content of the document. The document is in a format, such as Extensible Markup Language (XML) format, that allows structural information (such as content location and page layout information) to be separated from the content information of the document (text, vector graphics, and images). Content information and structural information, for purposes herein, are mutually exclusive parts of the document which in combination, form the entire document. The textual content information of the document can be extracted as a sequence of text elements or "tokens", each token roughly corresponding to a word, punctuation, or number sequence. The tokens of the document can then be individually encoded by the document owner (the client). In this format, the document can be sent from the client to the service provider who then processes and transforms the structural data of the document, based in part on the structural information associated with the encoded tokens. The service provider then returns the modified document to the client.

The method is particularly suited to a document format that allows decoupling the content information from the structural information. The content information includes content elements (e.g., characters or words forming tokens) while the structural information includes location information, such as position, width, and height of content elements, as well as page layout information, geometry, and typography, which may be generally referred to herein as metadata. The decoupling enables the content elements to be encrypted without encrypting the metadata or by encryption of the metadata with a different encryption method such as encryption using a separate key, allowing the metadata to be decrypted by the service provider (and operations to be performed on the metadata) without decrypting the content information, in particular, the encoded tokens.

The client's original documents may not be in a format that separates the text content from the structural information. Accordingly, scanned or legacy documents may be minimally processed, e.g., by the client, to convert them to a format that allows the text of the document to be automatically processed separately from the structural information associated with of the text.

The term "document" is used herein to refer to all versions of a document, which may be the result of the document being normalized, encoded, encrypted, modified, and/or otherwise processed in the exemplary method described herein.

Figure 1:
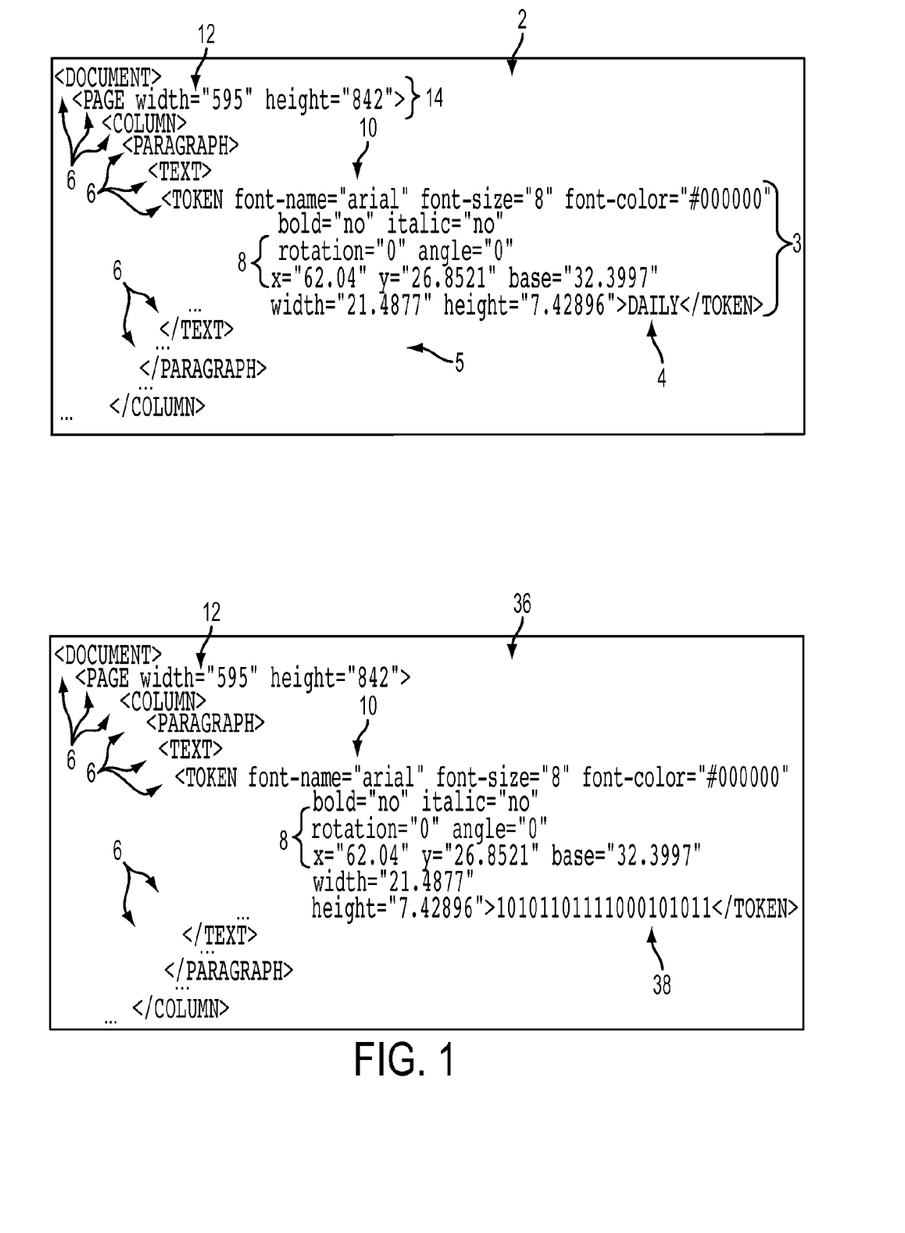
FIG. 1 illustrates an example XML document containing structural information portions and content information portions.

FIG. 1 illustrates an example input (source) document 2 in a structured format which may be processed using the exemplary method. The document 2 is in the form of a tree with a root node corresponding to the entire document and increasingly lower level nodes corresponding to page, column, paragraph, text (approximately a line of text or a part of a line) and, at the lowest level, token nodes 3, which include the textual content 4 of the document. In the illustrated document 2, the rest of the information constitutes the structural information 5. The illustrated structural information includes tags 6, location information 8, typographical information 10, and page layout information 12, although it is to be appreciated that structural information is not limited to such information.

First, each node of the tree-structured document is identified by a respective one of set 6 of tags (DOCUMENT, PAGE, COLUMN, PARAGRAPH, TEXT, TOKEN). The tags form part of the structural information portion of the document and identify the respective type of each of the nodes of the tree-structured document 2. In the example, each tag is recognizable by arrowheads < >. Each token node 3 includes a single text token 4, which generally includes one or more characters and is contained within arrowheads > <. Although only one token node including text content 4 (the word "DAILY") is shown in FIG. 1, it is to be understood that generally a document may include many text tokens, roughly one per word (in the case of documents converted using OCR, there may be some errors in separating tokens, resulting in a words being occasionally split into two or more tokens or two or more words combined into a single token).

While the exemplary content is shown as text 4 it is to be appreciated that the content portion may also include images and/or graphics.

Each text token 4 has location information 8 associated with it (here, incorporated into the token node 3, indicating the location of the token relative to a predefined location on the page, such as x,y coordinates relative to the top left corner of the page, as well as typographical information 10, such as font name, font size, font color, bold/not bold, italic/not italic, underline/not underline, and the like. Page layout information 12, in this example, is associated with the PAGE tag within a page level node 14. While not shown, other nodes may also have structural information associated with them. Although the format of the document 2 in FIG. 1 uses the standard XML format, any markup language format that separates textual content 4 from the structural information 5 may be employed.

Figure 2:
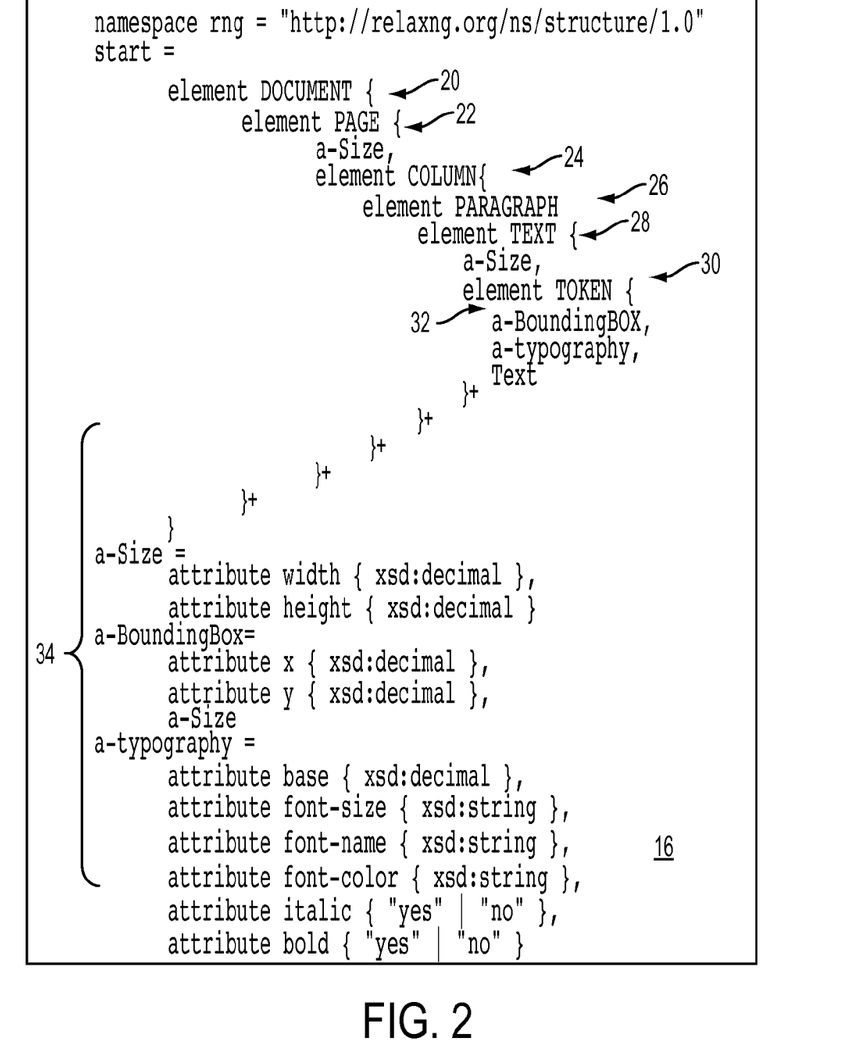
FIG. 2 illustrates an example ancillary XML document embodied as an XML schema.

In order to parse the document of FIG. 1, an ancillary document may be provided that defines the structure of the document, called a schema or Document Type Definition (DTD). An example schema 16 for the document of FIG. 1 is shown in FIG. 2. The schema defines the tags DOCUMENT 20, PAGE 22, COLUMN 24, PARAGRAPH 26, TEXT 28, and TOKEN 30. Some of these tags have attributes 32. Examples of attributes are "a-Size" and "a-BoundingBox" which denote the size and location of the content element (such as TOKEN 30). The attribute elements have typed values, as shown in the attribute section 34. Using the schema 16, the corresponding structural information 5 can be extracted from the document 2. In other embodiments, the structural information and content information in the document 2 can be extracted/distinguished without the need for a schema.

The format of FIGS. 1 and 2 is a simplified version of the XML structure produced by the open-source tool "PDF-to-XML." As noted above, a token contains, roughly speaking, one word.

The exemplary system and method make use of the fact that the structural information 5 provided in the XML format includes the location information 8 (e.g., size and position, rotation) of each text element 4. Thus, a bounding box which encompasses each text element can be defined, based on the location information. Since the metadata 8 contains the size and position, the textual content 4, corresponding to the image data from a scanned document is no longer needed, and need not be sent to the service provider for processing. That is, the image of the original, confidential document may be kept secret from the service provider and only the structural information 5 sent, optionally together with the appropriate schema 16.

In this way, the document can be processed by the service provider, which may include modifying some of the structural information, such as changing the location of text elements in the document, while the actual text content is not revealed to the service provider. Since the metadata is rarely considered as confidential information, the tags, etc., of the document and the schema may be revealed to the service provider, although they may be encrypted for transmission to the service provider.

In one embodiment, the text tokens 4 of the XML document 2 are individually encoded and each encoded token may be stored within the respective token placeholders > < in the transmitted document, without changing the structural information to account for a change in size of the encoded token 38. The encoding may be performed using symmetric or asymmetric encryption or by hashing the tokens, e.g. using a cryptographic hash function, such as the Message-Digest Algorithm (e.g., MD5). For the transformations described herein, either encryption or hashing may be used, and the term encoding is used to refer to encrypting or hashing the tokens into encrypted values or hash values.

FIG. 1 illustrates an exemplary text encoded document 36 which may be formed by encoding only the text tokens 4 to provided encoded tokens 38.

After the tokens have been encoded, the entire document 36, including already encoded values, may be globally encoded for transmission to form a fully-encoded document. The encryption of the text encoded document 36, for transmission between the client and the service provider, may be performed using any suitable encryption method, such as HTTPS (hypertext transport protocol HTTP over secure sockets layer SSL or transport layer security TLS) or application specific protocols, such as globally encrypting the document using an asymmetric or symmetric encryption scheme during the exchange. In the case where a symmetric scheme is used, the shared key is exchanged, for example, using a preliminary key exchange step which encrypts the shared key using an asymmetric encryption scheme. The encoding scheme (encryption or hashing) scheme may be agreed upon in advance or a protocol for choosing an encryption/hashing scheme during each document transfer may be agreed upon.

In one embodiment, the encoding includes inserting an XML attribute name 'id', which contains the identifier, e.g. <TOKEN>DAILY</TOKEN> is replaced with <TOKEN id="12345">abdcw</TOKEN>.

In another embodiment, each text element 4 is given an identifier, which is inserted in its place in the respective token placeholder, without changing the location information, and the text token 4 is extracted from the document and stored in a list, indexed by the identifier.

The exemplary system may rely on the same token encoding (encrypting or hashing) to the same value, so if tokens are processed, such as padded or salted, the processing may be consistent throughout the document when the same token is encrypted or hashed. This allows the client to keep the document text confidential and allows the service provider to deliver a service to the client without the need for disclosing proprietary software to the client.

Figure 3:
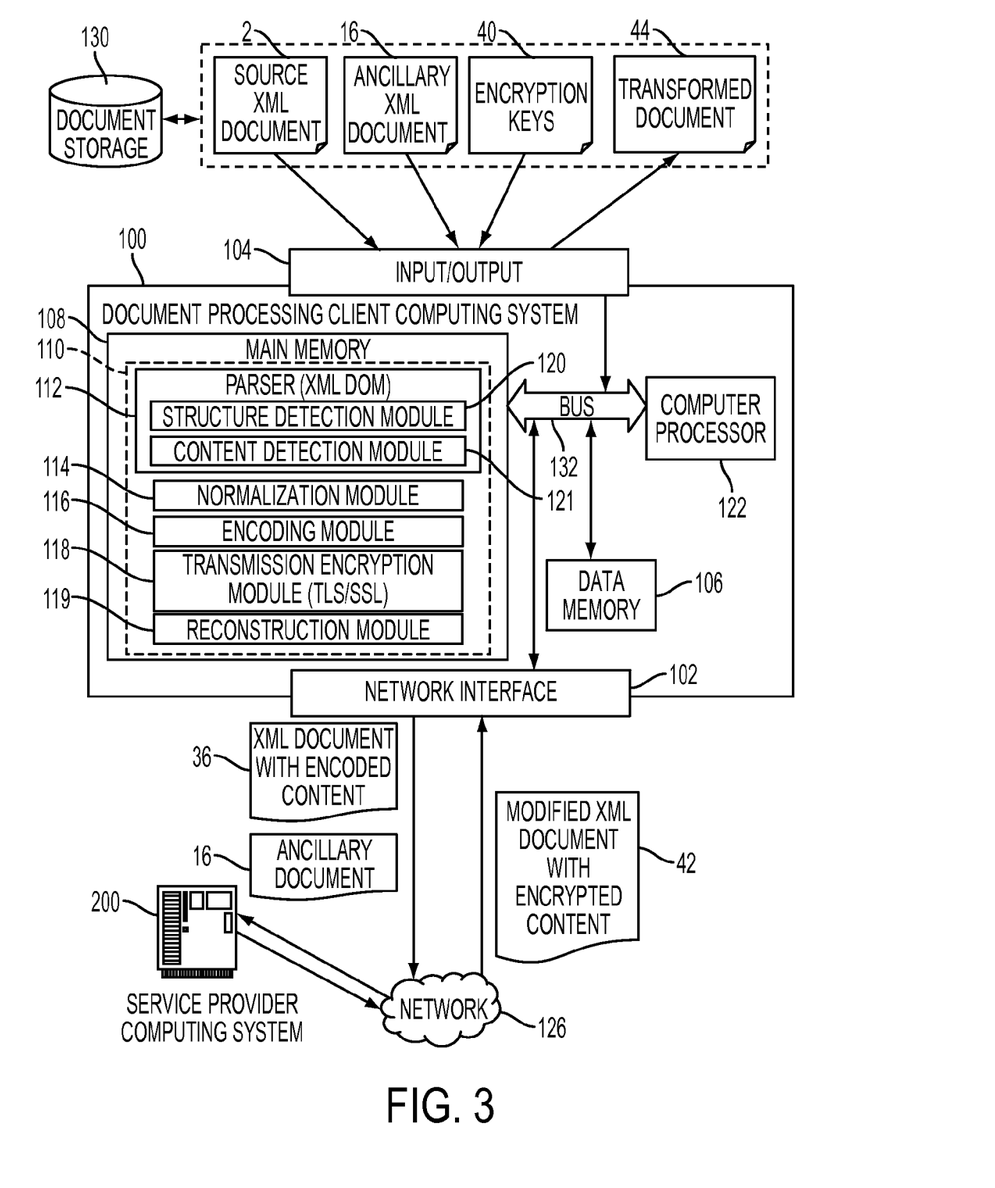
FIG. 3 illustrates a client system for encoding the content information of an XML document to be transferred to a service provider.
Figure 4:
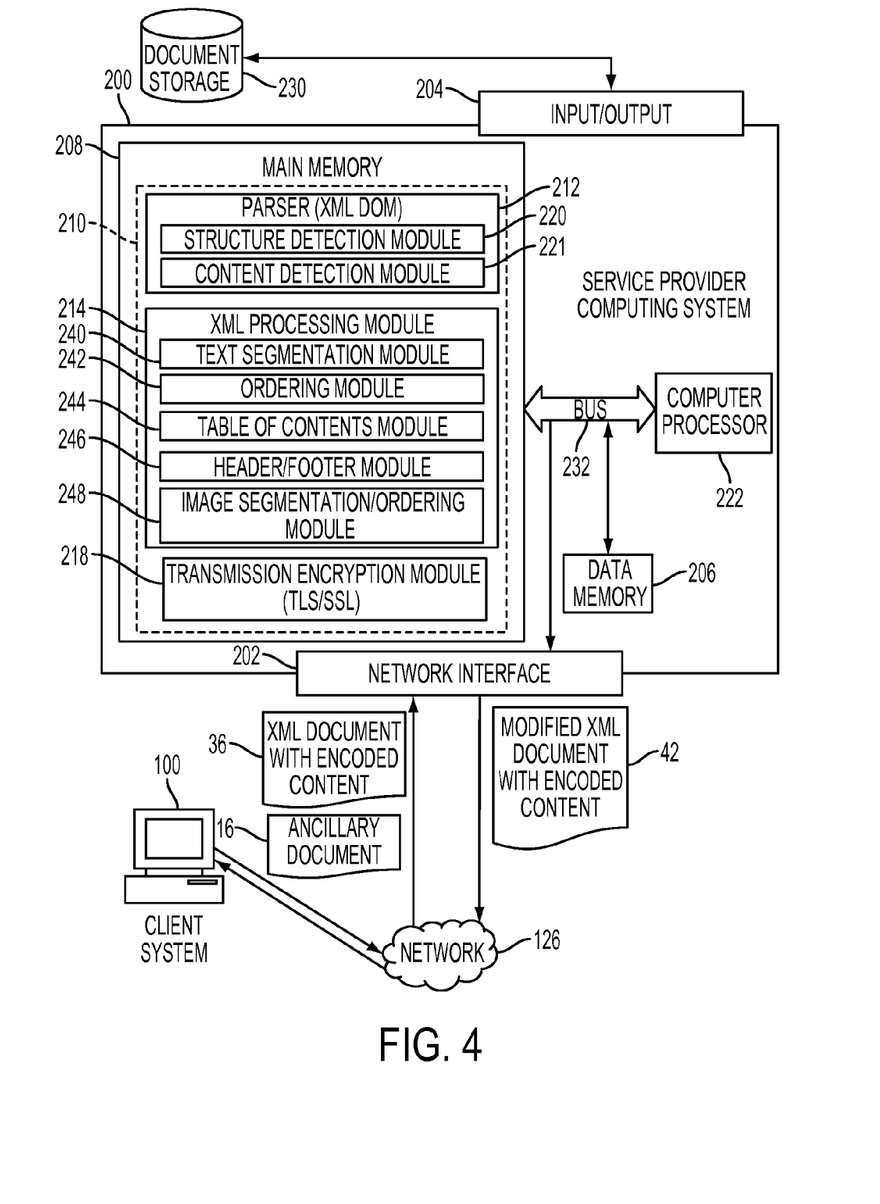
FIG. 4 illustrates a service provider system for processing an XML document having encoded content.

With reference now to FIGS. 3 and 4, a network computing system includes a client computing system ("client system") 100 for encoding a customer's XML documents 2 and a service provider computing system ("provider system") 200 for processing documents 36 with encoded content. The two systems 100, 200 may be entirely independently and separately controlled by separate entities, i.e., the client and the service provider. The systems 100, 200 can each include one or more computing devices that each include a respective network interface device 102, 202 for receiving and outputting documents across a network. Systems 100, 200 also have input/output devices 104, 204 for transmitting data to/from, for example, storage units such as disks or user interface devices. For example, client system 100 is connected to document storage device 130.

System 100 receives as input at least one unencrypted source XML document 2, an optional ancillary XML document 16, and an optional encryption key or keys 40. System 100 may receive an encoded, modified XML document 42, output from the service provider 200, which is decoded by the client device 100 to produce a transformed document 44.

System 200 receives as input an encoded XML document 36 and optional ancillary XML document 16. In the alternative, inputs 2, 16, 40, 36, and 42 may be produced by and/or stored in the respective systems 100, 200 themselves. In particular, the encryption key 40 may be generated as needed. In the exemplary embodiment, the input source document 2 and ancillary document 16 are XML documents. In alternate embodiments, input documents 2, 16, 36, and/or 42 may be any markup language document, e.g., a document representing a logical tree structure, wherein structural information may be separated from the content information. In some instances, the ancillary XML document 1& may not be needed, may already reside on the provider system 200, or may be input into the provider system 200 separately. In such instances, there may be no ancillary XML document 16 input into client system 100. In some embodiments, the ancillary XML document 16 may be encrypted at the client system 100 with an asymmetric encryption key received from the provider system 200. In this case, the service provider is trusted to the extent that the provider system 200 may decrypt the ancillary XML document 16 (but not the content 4 of source XML document 2) with a private key corresponding to the public encryption key.

The systems 100, 200 may process more than one source XML document 2 and/or ancillary XML document 16 at a time, either in parallel or serially. In such embodiments, each document may use a separate encryption key 40 for one or more documents 2, 36 although this is not required. For purposes of illustration, it is assumed that only one source XML document 2 and ancillary XML document 16 is processed at a time. During processing, source XML document 2, ancillary XML document 16, encryption key(s) 40, and XML document with encrypted content 38 may be stored in any suitable non-transitory data memory storage device 106, 206, such as a disk, ROM or RAM, or may be input into systems 100, 200 in the form of a carrier wave, e.g., via a wired or wireless network 126, such as the Internet. The network interfaces 102, 202 may include a modem link, a wired or wireless connection, USB port, floppy or hard disk receiver, transceiver portion of a cellular telephone, or the like and may be separated or combined with other components of systems 100, 200.

System 100 includes data memory 106 for storing the source XML document 2, ancillary XML document 16, encryption key 40, encoded XML document 14, and any other input or intermediate data generated during processing. System 200 includes corresponding data memory 206 for storing encoded XML document 36, ancillary XML document 16, and any other input or intermediate data generated during processing.

Main memory 108, 208 of systems 100, 200 stores instructions 110, 210, respectively for performing the exemplary method. In particular, main memory 108 of client system 100 stores a parser 112 (e.g. an XML document object model), a normalization module 114, a content encoding/decoding module (encoder) 116, a transmission encryption module 118 (which may be implemented as TLS/SSL), and a reconstruction module 119. The parser 112 includes a structure detection module 120 and a content detection module 121. Similarly, main memory 208 of provider system 200 stores a parser 212 (e.g. an XML document object model), an XML processing module 214, and a transmission encryption module 218 (which may be implemented as TLS/SSL). The parser 212 includes a structure detection module 220 and a content detection module 221.

It is to be appreciated that memories 106, 206, and 108, 208 of the respective systems 100, 200 may be embodied as a single memory unit, or that one or both of memories 106, 206, and/or 108, 208 may comprise two or more component memory units. The instructions 110, 210 are suitably executed by a corresponding digital processor 122, 222 such as respective computer processors. Each digital processor 122, 222 may be variously embodied, such as by a single core processor, a dual core processor (or more generally by a multiple core processor), a digital processor and cooperating math coprocessor, a digital controller, or the like. Outputs from modules 110, 112, 114, 116, 118, 119 may be stored in memory 106 and/or output via input/output device 104 or network interface devices 102 to the provider system 200 and outputs from modules 210, 212, 214, and 220 may be stored in memory 206 and/or output via input/output device 204 to client system 100 or another device such as an external computer having memory and/or a processor, optionally through a wired or wireless local or wide area network 126 such as the Internet.

In one illustrative example, systems 100 and/or 200 are hosted by a respective server computer that is part of a distributed or cloud computing network, in which case inputs and outputs may be made via a single network interface 102, 202, suitably networked to a portal server.

The software modules 112, 114, 116, 118, 119, and 212, 214, 218, of systems 100 and 200 are described briefly below. The functional characteristics of the modules are explained in greater detail with respect to the exemplary method(s) of FIGS. 5, 6, and 7.

The parser module 112 of system 100 parses the input XML documents 2 and 16 to identify the structural information portions 6, 8, 10, 12 and the content information portion 4. Similarly, the parser module 212 of system 200 parses the XML document 36 with encoded content (after the document-level encoding has been decoded). In one embodiment, the parsers 112, 212 are each configured to construct an XML document object model (DOM). Parser 112 includes a structure detection module 120 to detect and store the structural information portion of source XML document 2 and modified document 42 with encrypted content. Parser 220 similarly includes a structure detection module 220 to detect and store the structural information portion of encoded XML document 36 with encoded content. Each parser also includes a respective content detection module 121, 221 to detect and store the content portions 4 of the respective XML documents.

The normalization module 114 of client system 100 is configured for normalization of the text content 4, which may include one or more of changing all letters to lower case, removing accents, removing apostrophes, removing punctuation from within word tokens, removing numbers, removing small words (e.g., those with fewer than a predefined number of characters, such as tokens only one character, such as "a"); and removing stop words (words in a predefined set which occur in high frequency in documents, such as "and" and "the"). The client and service provider may agree ahead of time on what data normalization operations will be performed by the client system, if any. The normalization scheme employed by the normalization module 114 may be configured to allow the service provider to process the contents, even after they have been encrypted. The normalization may be dependent on what type of processing is to be performed by the service provider. Removing small words, accents, apostrophes and punctuation, and lower casing allows, for example, the XML processing module 214 of provider device 200 to find near matches that might differ by only punctuation or a small word to enable table of content detection. Once the text 4 is encoded, it becomes difficult to detect such near matches, as similar words (e.g., which differ in their case) tend to be encoded to completely unrelated values. Similarly, word tokens may include commas or periods in the tokens, causing a word to encode to a different value due to the included punctuation. That is "cat" and "cat?" may encode to different values. Removing punctuation, accents, and apostrophes avoids this. For other processing operations, it may be desirable to perform different normalization operations. For example, processing which identifies sentences and paragraphs may benefit from retaining some of these features. Thus, a document may be sent to the service provider two or more times, in different normalized forms, for different processing operations to be performed.

The content encoding/decoding module (encoder) 116 encodes the content 4 of the document 2 after it has been normalized (if any normalization is to be performed). The encoder 116 also decodes the content when the modified document 42 is received from the service provider. The reconstruction module 119 reconstructs the document, to generate the transformed (unencoded) document 44. Reconstruction of the modified document 42 may be desirable if, for example, a text reordering service has been provided. For some services, such as table of content (ToC) detection, which mainly add metadata, the reconstruction module 119 may only need to replace the metadata in source document 2 with the metadata from the modified document 42, avoiding the need to decode the modified document 42.

Optionally, a transmission encryption module (a document-level encryption module) 118 may be provided by the operating system that runs on the client system 100 or may be a higher level component. The encryption module 118 encrypts the text-level encrypted XML document 36 before it is transmitted to protect the document metadata 6, 8, 10, 12 from interception during transmission. This may be accomplished by shared key or asymmetric encryption. The encryption module 118 may encrypt the entire document, without regard to which part of the document is content or structure, potentially encrypting a portion of the document that is already encoded. The encryption module 118 also decrypts the modified document 42 when it is received from the provider system 200. The provider system 200 includes a corresponding encryption module 218 which decrypts the XML document 36 to provide an XML document with encoded content 38. The encryption module 218 is not configured for decoding encoded content 38 which was encrypted using a different encrypting scheme or encryption key. If the content 4 was hashed, there is generally no practical way to reconstruct the content 4 from the hash. The transmission encryption modules 118, 218 are optional and may not be used for each document.

The provider system 200 (FIG. 4) also includes an XML processing module 214, which may include one or more dedicated processing modules, illustrated as modules 240, 242, 244, 246, and 248. In the exemplary system 200 these modules perform, respectively, text segmentation, text ordering, ToC detection, header/footer detection, and image segmentation and ordering. These modules are discussed below with respect to the method of FIGS. 5. As will be appreciated, rather than several modules as shown, two or more of modules 240, 242, 244, 246, and 248 may be combined into a single module.

In the exemplary embodiment, components 110, 210, 112, 212, 114, 214, 116, 216, 118, 218, 119, 120, 220, 121, 221, 240, 242, 244, 246, and 248 comprise software instructions stored in respective main memory 108, 208, which are executed by the respective computer processor 122, 222. The processor 122, 222, such as the computer's CPU, may also control the overall operation of the respective computer systems 100, 200 by execution of processing instructions stored in memories 108, 208 and/or 106, 206. Hardware components 102, 104, 106, 108, and 122 may be communicatively connected by a data control bus 132. A similar data control bus 232 for device 200 connects hardware components 202, 204, 206, 208, and 222.

As will be appreciated, systems 100, 200 may include fewer or more components/modules while still having the same functionality. For example, components 112, 114, 116, 118, 119, 120, and 121 may be combined to form fewer components, or may be functionally separated to form more individual components. The same may apply to components of device 200.

The client system 100 and encrypted XML processing service provider system 200 may each comprise one or more computing devices, such as a personal computer, PDA, laptop computer, server computer, or combination thereof. In some embodiments, the systems 100, 200 may be incorporated into an overall distributed architecture. Memories 106, 108 (206, 208) may be integral or separate and may represent any type of computer readable medium such as random access memory (RAM), read only memory (ROM), magnetic disk or tape, optical disk, flash memory, or holographic memory. In one embodiment, the memories 106, 108 (206, 208) comprise a combination of random access memory and read only memory. In some embodiments, the processor 122 (222) and memory 106 (206) and/or 108 (208) may be combined in a single chip.

The systems 100, 200 may output a portion or all of outputs 36, 42 to an external output device, such as a client terminal, database system, or the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in a storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5:
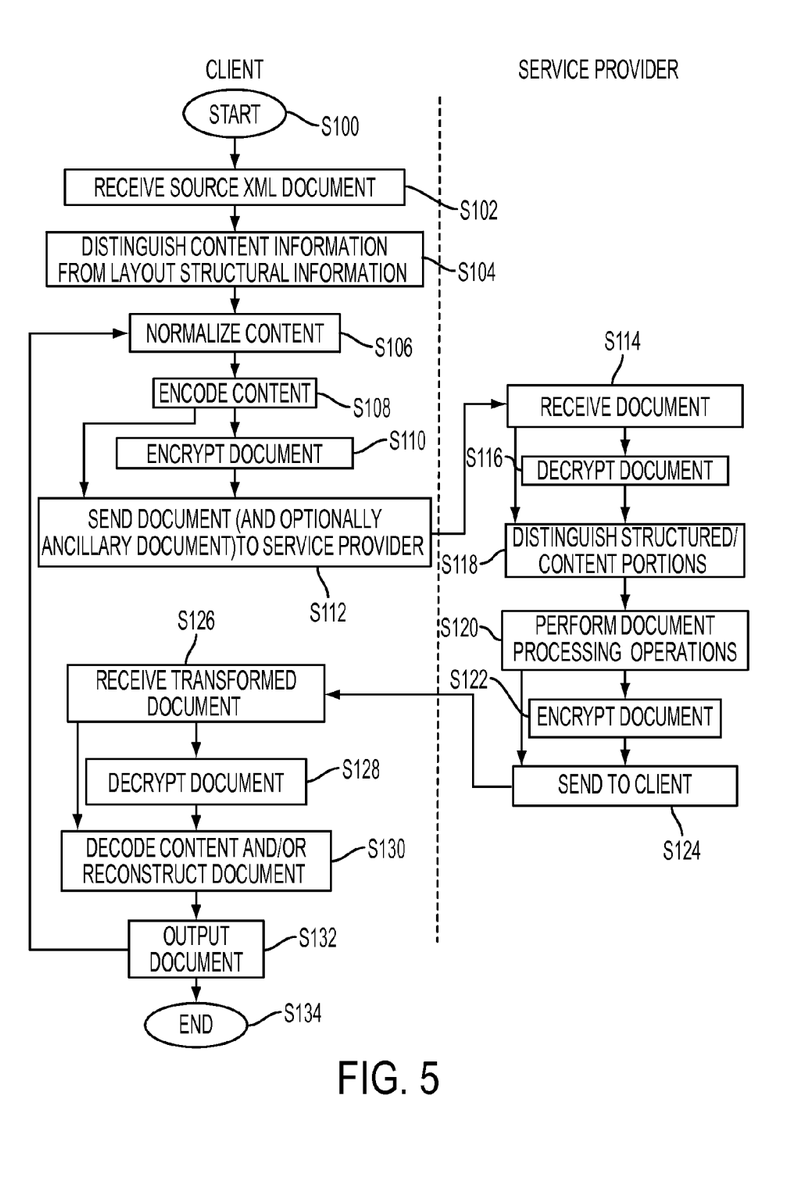
FIG. 5 is a flow chart illustrating an exemplary method for processing an XML document.

FIG. 5 illustrates an integrated method for processing an XML document performed by the client system 100 and the service provider 200 remotely through a network 126 such as the Internet. Before transmitting a document 36, the client and service provider may agree on a data normalization method and, optionally, a transmission encryption method.

The method begins at S100.

At S102, a source XML document 2 is received by client system 100, and may be stored in memory 106 during processing. The XML document 2 may be retrieved from document storage 130. Optionally an ancillary document 16 is also retrieved. In some embodiments, document 2, is generated from a scanned document that is transformed into an XML document. This may involve performing optical character recognition on the scanned document and storing the document as a PDF. A conversion tool, such as PDF2XML, may be used to translate the document from an unstructured or minimally structured format such as PDF, to XML. Alternatively, the document may be a legacy document translated into XML by a process specific to the format of the legacy document.

At S104, the content portions of document 2 are identified. The content containing portions 4 and the structural information 6, 8, 10, 12 are identified/distinguished, for example, by the structure detection module 120 and/or content detection module 121 of the parser 112, optionally using the schema 16. For example, all portions within inverted arrows or other content-denoting symbols may be identified as text content portions 4.

At S106, the content portions of document 2 are optionally normalized, e.g., using normalization module 114.

At S108, the content portions 4 only of document 2 are encoded, e.g., by encoder 116, to produce document 36 with encoded content. Each token 4 is separately encoded to provide a respective encoded element 38, which in the exemplary embodiment is stored in its respective TOKEN node 3. The content portions 4 of document 2 may be encoded (S108) by hashing or encryption, token by token. Because the content is encoded token by token, the service provider system can still perform textual similarity comparison between text elements or between sequences of text elements, as two tokens 4 consisting of the same word will hash or encrypt to the same value. A shared key may be used, as the content may only be decrypted by the client system 100, though public/private key encryption may be used. The content may alternatively be hashed, for example using MD5.

At S110, the document 36 may be encrypted as a whole in a manner which can be decrypted by the service provider to protect against third parties intercepting the document during transmission. The structural information 5 may be left unencrypted, in markup language text, or may be at least partially encrypted by shared key or a public key of the service provider, allowing the service provider to decrypt the structural information. The ancillary document 16, if used, may also be encrypted using a shared key or the service provider's public key, if it is to be transmitted to the service provider. For example, the normalized document is optionally encrypted by globally encrypting the entire document or by encrypting only the plain text structural portions. The global encrypting approach may be performed by the module 118 using TSL/SSL.

At S112 the encoded and optionally encrypted document 36 is transmitted to the provider system 200 e.g., via the network 126.

At S114, the document 36 is received by the system 200 and stored in memory 206. At S116, in the case of a document which has been encrypted at S110, the document is decrypted, e.g., by the module 218.

At S118, the structural portions and encoded content portions of document 14 are identified/distinguished by structure detection module 220, and/or content detection module 221 of the parser 212, optionally using the ancillary document, similarly to step S220 of FIG. 6.

At S120, one or more processing operations are performed on the text document 36. In particular, one or more modules of the XML processing module 214 operate on the decrypted, but still content-encoded document 36 to produce a modified document 42. Textual operations (which may involve changing image locations) on the document may include one or more XML operations, possibly using ancillary document 16, on the document 36 to produce a modified document 42. The operations, discussed below, may include one of text ordering, text segmenting, table of contents (ToC) recognition, page header/footer detection, and image segmentation/ordering.

At S122, the document may be re-encrypted, e.g., by module 218, optionally using the same document encryption scheme used by system 100. This may be performed similarly to step S110 of FIG. 5. The ancillary document generally need not be re-encrypted, as the ancillary document contains unaltered structural information, and may not be sent back with the document 36.

At S124, the processed and optionally encrypted document 42 is output, e.g., transmitted back from the system 200 to system 100, e.g., via the network 126.

At S126, the modified document 42 is received by the system 100, which can be the same or a different computing device from the device 100 which transmitted the document to the system 200, and stored in memory 106.

At S128, the modified document 42 received by the client system 100 is decrypted, if it was sent from the service provider in encrypted form.

At S130, the processing performed on the document 36 by the provider system 200 is used to generate a transformed document 44. In one embodiment, this may be achieved by decoding the encoded content 38 of document 42 and reconstructing the document to produce document 44. In other embodiments, the changes between document 36 and document 42 that were implemented by the XML processing module 214 are identified from the modified document 42 and applied to the original document 2 to generate document 44. In the exemplary embodiment, this allows the client system 100 to generate a document which is equivalent to that which would have been generated had the service provider been provided with the source document in an unencoded form, but optionally encrypted as a whole in a manner which allows the service provider to decrypt the document including the tokens.

At S132, the client system may output document 44, for example to document storage system 130 or to a user. In other embodiments, the method may return to S106, where a different normalization operation may be performed and steps S108-S130 repeated, such that at S120, a different processing operation is performed on the encoded document 36. This further processing may be performed by the same or a different provider system 200. As will be appreciated, the method may be reiterated more times.

The method ends at S134.

Further details of the method will now be described.

Normalization (S106)

The normalization may include one or more of converting all characters to lower case, converting accented characters to unaccented characters (or to a combination of characters), removing apostrophes, removing punctuation from within word tokens, removing numbers, and ignoring or removing short words, etc. Once text is encoded, the normalization generally cannot be accomplished. The service provider may provide the software tool 114 for performing normalization, as the normalization steps are determined by what transformations will be performed by the service provider.

In some embodiments, the XML schema may be enriched to allow normalization information to be incorporated into the document 2 and passed to the service provider. For example, one or more new XML attributes may be introduced, e.g. via attributes such as Capitalized="true". However, this may entail modifying the processing software used by the service provider, which may not be desirable for maintaining conformity over a variety of different clients. In another embodiment, differences in capitalization may be incorporated into the encryption (capital letters encrypted as capitals and lower case letters as lower case). Although providing a relatively weak level of protection, this may not be a problem.

In another embodiment, the textual content may be normalized and encoded at the same time by replacing any lowercase letter by 'l' (for instance), any uppercase letter by 'L', and any number by '0'. The text is lost (i.e., it cannot be regenerated from the encoding) but the customer can reconstruct the appropriate result by re-injecting the text in the token placeholders of the modified document 42 or by incorporating the modifications made in the modified document 42 into the source document 2. While this method preserves the same number of characters in the encoded token, this can be a disadvantage for security. In another embodiment, any sequence of 'l' is replaced by one single 'l'. This may provide better encryption but the word length is lost.

As noted in above-mentioned U.S. application Ser. No. 13/103,216, low entropy encrypted data may, in some cases, raise a security issue, for example if common text values are easily guessed by an attacker. In one embodiment, the method makes use of use encryption padding to make calculating the encryption mechanism more difficult. Identical padding may be used for identical tokens to ensure that they encrypt to the same value.

In some embodiments, normalization may include removal of common prefixes and suffixes, such as removal of "ing" and "ed" to allow conjugated verbs to match each other.

In some embodiments, the service provider system 200 may be configured to receive and process both encoded and unencoded documents (e.g., from two different clients with different security needs). In one embodiment, the service provider's XML processing module 214 need not be able to distinguish between encoded and unencoded text and may perform a second normalization on all documents, even encoded documents. By using an encoding alphabet that is normalization safe (unchanged by the second normalization algorithm), this second normalization by the service provider can be performed without the service provider having to provide separate processing paths for encoded and unencoded documents. The encoding alphabet (after normalization), may thus contain only lower case characters and contain no accents or white space characters. In another embodiment, the service provider processing module 214 may be aware of whether it receives encoded or unencoded text, or may be configured for detecting the different forms of text automatically. In some embodiments, where the service provider system 200 performs a second normalization, the service provider system may also "de normalize" the document after processing, by keeping track of all normalized operations and undoing them.

Document Processing (S120)

Example content (e.g., text) processing operations which may be performed on encrypted document 36 at S120 may include some or all of the following.

Text Ordering and Segmentation

The text segmentation module 240 segments the flow of text into lines and paragraphs. The text ordering module 242 orders the flow so as to respect human-reading order. For example, if an original document has two columns, the contents of the two columns may, after scanning and OCR, be stored in one large column, in which each row contains a space in the middle, separating the two columns. While such format would print correctly and be viewable on screen, converting the document to HTML or epub would render the document unreadable. The text ordering module is configured to recognize the two columns and re-order the text so that lines run consecutively, allowing further conversion into another format. The text ordering may move the encrypted or hashed tokens to new locations in the document to produce modified document 42. On receipt, the reconstruction module 119 of the client system may replace the encoded tokens with their corresponding words to reconstruct the document text.

Segmentation identifies paragraphs in the document, which can be an aid to other services, discussed below. The segmentation module 240 may store the paragraph information by the addition of metatags (structural information) to the document 36 to produce modified document 42. Generally, segmentation works at a page level, and does not consider paragraphs which span two or more pages. This is generally sufficient to allow for further processing. Both segmentation and text ordering generally rely on the geometry of the words (tokens) on a page. As text ordering and segmentation services rely on the page layout data 12 of the structural data (such as location and size), the client system may encrypt or hash each token (word) without altering the operation of the text ordering and segmentation module.

In the case of text ordering and segmentation, the service provider system does not generally need to compare the encrypted text content 36, so, for this particular service, it may be sufficient to use a serial number or other unique identifier for each token, rather than encryption or hashing. However, since text ordering and segmentation is often performed as a precursor to other services, it may be advantageous to use encryption or hashing, to avoid having to construct a second version of the encoded document 36 for the service provider to perform the subsequent operations.

In another embodiment, the client system may add a tag to the metadata 6 of the document 36, indicating the order of the tokens, and the text ordering module 242 of the service provider system may update the metadata to reflect the modified ordering of the tokens.

In another embodiment, a format that is line based rather than token based is used. Each row of text is made up of one or more lines. For example, in a two column document, each row may contain a maximum of two lines, in the ideal case. The metadata 6 may contain a line order tag, which the service provider may update, after reordering portions of lines instead of single tokens. This approach may also be extended to paragraphs. Recognizing lines or paragraphs may entail greater sophistication on the part of the client's scanning software and/or greater processing on the client system. One potential advantage of this approach is that the encryption or hash can be more secure, as larger chunks may be encrypted, making it more difficult for an unauthorized user to infer any plaintext from the layout of the document. As with the unique identifier approach above, however, too large of a chunk of text may make further processing on the encrypted text difficult. In the line or paragraph approach, a hash method, possibly salted, could be used. The customer simply needs to re-construct the correct output document by identifying the location of the original text document by finding its hash. The document partition is preserved by the service provider system and that the parts generally have a unique identifier, allowing the customer to project the newly created metadata (in the received, encrypted document 42) back onto the original document 2.

The identification of text order and segments can be performed using existing techniques. Order may be detected, for example, from layout clues that indicate columns. Segments may be inferred from gaps or whitespace in the document. An XY cut method may be used to find narrow or wide strips to identify paragraphs and/or lines, as described in U.S. Pat. No. 7,392,473 to Meunier, entitled METHOD AND APPARATUS FOR DETERMINING LOGICAL DOCUMENT STRUCTURE. An example method for segmenting a document is described in US Pub. No. 2004/0013302 to Ma, et al., entitled DOCUMENT CLASSIFICATION AND LABELING USING LAYOUT GRAPH MATCHING. The disclosures of both of these documents are incorporated herein by reference in their entireties.

Table of Contents Recognition

The Table of Contents (ToC) module 244 may process document 36 after processing by the document ordering module 240 and/or segmentation module 242.

The ToC module is configured for recognizing a Table of Contents in a document, if it exists, and for each entry in the ToC which is identified, to construct a link or other pointer to the portion of the document referenced by the entry in the ToC. Paragraphs or pages which are referenced by the ToC may also be labeled by a metadata tag. This can be a flag or Boolean, that is true for paragraphs or pages which are referenced by the ToC. The ToC referenced paragraphs or pages may also be labeled with metadata identifying the link from the ToC. Methods for identifying a table of contents may be found in U.S. Pat. No. 7,890,859, issued Feb. 15, 2011, entitled RAPID SIMILARITY LINKS COMPUTATION FOR TABLE OF CONTENTS DETERMINATION, to Meunier, and U.S. Pat. No. 7,743,327, entitled TABLE OF CONTENTS EXTRACTION WITH IMPROVED ROBUSTNESS, to Meunier and Déjean, the disclosures of which are incorporated herein by reference in their entireties.

The ToC module 244 may function by first computing the textual similarity between pairs of document parts, where the parts can each be a sequence of tokens, such as a paragraph, line, a few tokens, or even a single token, then by identifying the ToC based on this pairwise similarity. In the exemplary embodiment, the sequences compared can be sequences of encoded tokens 38. The ToC may be further refined using the metadata (e.g., clues such as typography changes or page layout).

The similarity measure used by the ToC module 244 may function better if the normalization of the textual content provides lowercasing and removes small, frequent words that, when encoded, could cause text which should be considered sufficiently similar to be a match to be treated as different.

Once the service provider sends back the result 42, the reconstruction module 119 of the client system may update the original document 2 with the updated ToC and additional metadata (link locations and paragraph flags). Generating a ToC generally does not reorder the textual data, so the client need not decrypt or look up the hash values of the encoded content 38, however, this method of reconstruction is not excluded.

Page Headers/Footers

The header/footer module 246 can perform one or both of page header detection and page footer detection, in which encoded tokens 38 are tagged with metadata identifying them as being part of a respective header or footer. This detection may be based on structural information and/or similarity between the encoded tokens on subsequent pages. The client system can thus treat the header and footer as regular text, relying on the header/footer module 246 of the service provider to identify the header and footer based on, for example, page layout, in a similar manner to text ordering and segmentation. The header and footer information may be tagged by adding tags to the metadata.

The module 246 may also be configured for detection of page numbers, which may involve recognition of a pattern of numbers (Arabic and/or Roman numerals) and replacing them with a simple regular expression. This may entail the encoding scheme incorporating a detectable sequentiality.

Page header/footer detection may be performed, for example, using the methods described in U.S. Pat. No. 7,937,653, issued May 3, 2011, entitled METHOD AND APPARATUS FOR DETECTING PAGINATION CONSTRUCTS INCLUDING A HEADER AND A FOOTER IN LEGACY DOCUMENTS, by Nervé Déjean, et al., the disclosure of which is incorporated herein by reference in its entirety.

Images

Images in the document 36 may also be segmented and/or ordered by the image segmentation/ordering module 248. This may be performed similarly to the text ordering already described, for example, based on size, layout, and similarity of nearby text. Groups of related images may be identified and kept together as one large image. In one embodiment, the images are not sent within the encoded document, only their bounding boxes. No data about the image need be sent other than its dimensions, so encryption of the images is unnecessary. In another embodiment, the images are encrypted or hashed. Surrounding text may be identified as labels or captions associated with the image. Text surrounding the image may be used to identify an image that is referenced by the ToC. Just as in the case of text ordering, the images may be moved in the document.

In another embodiment, the images (or bounding boxes) in the encoded document may have metadata associated with them at the client system, indicating their sequence in the document. This information may be modified by the image segmenting/ordering module 248.

The following references, the disclosures of which are incorporated herein by reference in their entireties, relate to other methods of page layout analysis which may be adapted to use by the XML processing module 214: U.S. patent application Ser. No. 13/484,708, filed on May 31, 2012, entitled TYPOGRAPHICAL BLOCK GENERATION, by Hervé Déjean; U.S. patent application Ser. No. 13/462,053, filed on May 2, 2012, entitled POST OPTICAL CHARACTER RECOGNITION DETERMINATION OF FONT SIZE, by Jean-Luc Meunier, U.S. Pat. No. 5,708,730, entitled TABLE RECOGNITION APPARATUS, by Katsuhiko Itonori; U.S. Pat. No. 6,785,420, entitled METHOD AND APPARATUS FOR TABLE RECOGNITION, APPARATUS FOR CHARACTER RECOGNITION, AND COMPUTER PRODUCT, by Toshifumi Yamaai; U.S. Pat. No. 7,392,473, issued Jun. 24, 2008, entitled METHOD AND APPARATUS FOR DETERMINING LOGICAL DOCUMENT STRUCTURE, by Jean-Luc Meunier; U.S. Pat. No. 7,693,848, issued Apr. 6, 2010, entitled METHOD AND APPARATUS FOR STRUCTURING DOCUMENTS BASED ON LAYOUT, CONTENT AND COLLECTION, by Hervé Déjean, et al.; U.S. Pat. No. 7,739,587, issued Jun. 15, 2010, ENTITLED METHODS AND APPARATUSES FOR FINDING RECTANGLES AND APPLICATION TO SEGMENTATION OF GRID-SHAPED TABLES, by Jean-Yves Vion-Dury; U.S. Pub. No. 20060155703, published Jul. 13, 2006, entitled METHOD AND APPARATUS FOR DETECTING A TABLE OF CONTENTS AND REFERENCE DETERMINATION, by Hervé Déjean, et al.; U.S. Pub. No. 20120005225, published Jan. 5, 2012, entitled METHOD FOR LAYOUT BASED DOCUMENT ZONE QUERYING, by Boris Chidlovskii; U.S. application Ser. No. 12/974,843, filed on Dec. 21, 2010, entitled SYSTEM AND METHOD FOR LOGICAL STRUCTURING OF DOCUMENTS BASED ON TRAILING AND LEADING PAGES, by Hervé Déjean; U.S. application Ser. No. 13/155,011, filed Jun. 7, 2011, entitled A GENERATE-AND-TEST METHOD FOR COLUMN SEGMENTATION by Hervé Déjean; and U.S. application Ser. No. 13/162,858, filed Jun. 17, 2011, entitled DETECTION AND EXTRACTION OF ELEMENTS CONSTITUTING IMAGES IN UNSTRUCTURED DOCUMENT FILES, by Hervé Déjean.

The method illustrated in FIG. 5 may be implemented in one or more computer program product(s) that may be executed on a respective computer. The computer program product(s) may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any devices, capable of implementing a finite state machine that is in turn capable of implementing a respective part of the flowchart shown in FIG. 5, can be used to implement the exemplary method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for processing an encoded source document, the system comprising:
   memory which receives an encoded source document from an associated client system, the encoded source document comprising structural information and encoded content information, the encoded content information comprising a plurality of encoded tokens generated by individually encoding each of a plurality of text tokens of the source document, the encoding comprising at least one of encrypting and hashing each of the tokens, the structural information comprising location information for each of the plurality of text tokens;
   a processing module for processing the encoded document to generate a modified document, without decoding the encoded tokens, the processing including modifying some of the structural information of the encoded source document; and
   a transmission module for transmitting the modified document to an associated client system, whereby the client system is able to generate a transformed document based on the modified document and the plurality of text tokens; and
   a processor which implements the modules.

2. The system of claim 1, wherein the processing module is configured to perform at least one of:
   segmenting the encoded document;
   ordering the encoded document;
   detecting a table of contents in the encoded document; and
   detecting at least one of a header and a footer in the encoded document.

3. The system of claim 1, wherein the at least a part of the structural information comprises the location information of the tokens and the processing module utilizes the location information.

4. The system of claim 1, wherein the location information defines a position and size of a bounding box of each text token.

5. The system of claim 1, wherein the content information of the encoded document includes a first sequence comprising at least a first encoded token and a second sequence comprising at least a second encoded token, the processing module being configured for computing a measure of similarity between the first and second encoded tokens and generating a modified document based on the computed similarity.

6. The system of claim 1, wherein the processing module generates the modified document based on the encoding values of the encoded tokens.

7. The system of claim 1, wherein the encoded source document comprises an XML document.

8. The system of claim 1, wherein the processing of the encoded source document allows the associated client system to generate a transformed document which is equivalent to that which would have been generated had the service provider system been provided with access to the text tokens of the source document.

9. A network computing system comprising the computer system of claim 1 and a client system which generates the encoded document, receives the modified document from the computer system, and generates the transformed document.

10. A computer program product comprising a non-transitory recording medium which stores instructions for performing the method of claim 1.

11. A method of processing an encoded source document, the method comprising:
   receiving an encoded source document from an associated client system, the encoded source document comprising structural information and encoded content information, the encoded content information comprising a plurality of encoded tokens, the encoded tokens having been generated by individually encoding each of a plurality of text tokens of the source document to a respective value, the encoding of each of the plurality of text tokens comprising at least one of encrypting and hashing, the structural information comprising location information for each of the plurality of tokens;
   with a processor, processing the encoded document, without decoding the encoded tokens, to generate a modified document, the processing including modifying some of the structural information; and
   transmitting the modified document to an associated client system, whereby the client system is able to generate a transformed document based on the modified document and the plurality of text tokens.

12. The method of claim 11, further comprising providing a normalizing algorithm to the client system for normalizing the source document prior to generating the encoded source document.

13. A computer system comprising:
   memory which receives an XML source document, the source document including content information, and structural information, the content information comprising a plurality of text tokens, the structural information comprising location information for each of the plurality of text tokens;
   an encoding module which encodes each of the plurality of text tokens individually to produce an encoded XML document comprising encoded tokens, the encoding comprising at least one of encrypting and hashing each of the plurality of text tokens;
   a transmission module which transmits the encoded document to an associated service provider for processing the encoded document to generate a modified document, without providing the service provider with access to the content information of the source document, the encoded document being transmitted in a manner which allows the service provider to access at least a part of the structural information without decoding the encoded tokens;
   a reconstruction module which generates a transformed document based on the modified document received from the service provider and the text tokens; and
   a processor which implements the modules.

14. The system of claim 13, wherein the encoding module encodes the text tokens without encoding the structural information.

15. The system of claim 13, wherein the at least a part of the structural information comprises the location information of the tokens and the processing provided by the service provider utilizes the location information.

16. The system of claim 13, further comprising a normalization module which normalizes the content information before the content information is encoded.

17. The system of claim 16, wherein the normalization includes at least one of:
   converting all upper case characters in each token to lowercase characters;
   removing accents;
   removing apostrophes;
   removing punctuation from within word tokens;

removing numbers;
removing small words; and
removing stop words.

18. The system of claim 13, wherein in the encoding, identical tokens are encoded to identical encoded values.

19. The system of claim 13, wherein the transmission module encrypts the encoded document prior to transmission.

20. The system of claim 13, wherein the processing provided by the associated service provider comprises at least one of:
segmenting the encoded document;
ordering the encoded document;
detecting a table of contents in the encoded document; and
detecting at least one of a header and a footer in the encoded document.

21. The system of claim 13, wherein the generating of the transformed document comprises at least one of:
decoding encoded tokens of the modified document;
replacing at least some of the structural information of the source document with structural information of the received modified document; and
inserting the text tokens in place of the encoded tokens in the modified document.

22. A method of processing a source document, the method comprising:
receiving an XML source document, the source document comprising structural information and content information, the content information comprising a plurality of text tokens;
encoding each of the plurality of text tokens individually to produce an encoded XML document;
transmitting the encoded XML document to an associated service provider for processing the encoded XML document to generate a modified XML document, without providing the service provider with access to the content information of the XML source document, the encoded XML document being transmitted in a manner which allows the service provider to access at least a part of the structural information without decoding the content information; and
generating a transformed document based on the modified document received from the service provider; and
outputting the transformed document.

23. The method of claim 22, wherein the encoding of the text tokens comprises encrypting each text token with a symmetric private key.

24. The method of claim 22, wherein the structural information comprises location information derived from XML document markup tags.

25. The method of claim 22, further comprising:
at the service provider, receiving the encoded source document and, without decoding the encoded tokens, performing a processing operation comprising at least one of: text ordering, text segmenting, table of contents detection, head detection, footer detection, and image ordering, the at least one processing operation producing a modified encoded document.

26. The method of claim 22, further comprising, prior to the encoding of the document, distinguishing the content information from the structural information.

27. A computer program product comprising a non-transitory recording medium which stores instructions for performing the method of claim 22.

* * * * *